US012140114B1

(12) United States Patent
Pelzetter et al.

(10) Patent No.: US 12,140,114 B1
(45) Date of Patent: Nov. 12, 2024

(54) SYSTEM, VEHICLE AND METHOD FOR LUBRICATING A HYDROGEN INJECTOR IN A VEHICLE

(71) Applicants: Hyundai Motor Company, Seoul (KR); Kia Corporation, Seoul (KR)

(72) Inventors: Roman Pelzetter, Reichelsheim (DE); Ulrich Karrer, Mainz (DE); Bernd Friedrichs, Riedstadt (DE); Leigh Deissenroth, Mainz (DE); Milos Tichy, Griesheim (DE); Markus Peppler, Gau-Bischofsheim (DE); Andreas Kapp, Eschborn (DE)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/506,217

(22) Filed: Nov. 10, 2023

(30) Foreign Application Priority Data

Apr. 25, 2023 (DE) .......................... 102023110535.3

(51) Int. Cl.
  *F02M 63/00* (2006.01)
  *B01D 53/26* (2006.01)
  (Continued)

(52) U.S. Cl.
  CPC ....... *F02M 63/0001* (2013.01); *B01D 53/265* (2013.01); *C01B 21/38* (2013.01); *F01N 3/005* (2013.01); *F02M 25/0222* (2013.01); *F02M 25/025* (2013.01); *B01D 2257/80* (2013.01); *B01D 2258/01* (2013.01)

(58) Field of Classification Search
  CPC .......... F02M 21/0221; F02M 25/0206; F02M 25/0221; F02M 25/0222; F02M 25/0224; F02M 25/0227; F02M 25/025; F02M 25/028; F02M 25/03; F02M 25/10; F02M 61/00; F02M 61/0001; F01N 3/005; F01N 3/05; F01N 2340/06; F01N 2610/00; F01N 2610/1406; F01N 2610/1453; F02D 19/024; F02D 19/12; F02D 19/0644; F02D 41/0027; F02B 29/0468; F02B 47/02; B01D 53/265; B01D 2258/01; C01B 21/38; Y02T 10/12; Y02T 10/30
  See application file for complete search history.

(56) References Cited

U.S. PATENT DOCUMENTS 5,668,014 A * 9/1997 Aoki .................... G01N 35/085
  436/52
6,739,125 B1 * 5/2004 Mulligan .............. F01N 3/2073
  60/303

(Continued)

*Primary Examiner* — Logan M Kraft
*Assistant Examiner* — Johnny H Hoang
(74) *Attorney, Agent, or Firm* — Slater Matsil, LLP

(57) ABSTRACT

An embodiment system for lubricating a hydrogen injector in a vehicle includes an extraction and separation device configured to collect at least a fraction of an exhaust gas of a hydrogen combustion engine and separate a water component from the collected fraction of the exhaust gas to provide liquid water and dried exhaust gas and a reactor connected to the extraction and separation device and configured to generate nitric acid from the liquid water and a nitrogen oxide content of the dried exhaust gas, wherein the hydrogen injector is connected to the reactor and configured to receive the generated nitric acid for lubrication.

20 Claims, 3 Drawing Sheets

(51) Int. Cl.
*C01B 21/38* (2006.01)
*F01N 3/00* (2006.01)
*F02M 25/022* (2006.01)
*F02M 25/025* (2006.01)

(56) References Cited

U.S. PATENT DOCUMENTS

| | | | |
|---|---|---|---|
| 7,357,338 B1 * | 4/2008 | Reatherford | F02M 21/0263 |
| | | | 239/585.4 |
| 2004/0088970 A1 * | 5/2004 | Mulligan | F02M 21/0227 |
| | | | 60/276 |
| 2005/0183337 A1 * | 8/2005 | Cadours | C10L 3/10 |
| | | | 48/197 R |
| 2007/0028905 A1 * | 2/2007 | Shinagawa | C01B 3/26 |
| | | | 123/575 |
| 2022/0017365 A1 * | 1/2022 | Barnea | C01B 21/42 |

\* cited by examiner

SYSTEM, VEHICLE AND METHOD FOR LUBRICATING A HYDROGEN INJECTOR IN A VEHICLE

CROSS-REFERENCE TO RELATED APPLICATIONS

This application claims the benefit of German Patent Application No. 102023110535.3, filed on Apr. 25, 2023, which application is hereby incorporated herein by reference.

TECHNICAL FIELD

The present invention pertains to a system for lubricating a hydrogen injector in a vehicle, a vehicle, and a method for lubricating a hydrogen injector in a vehicle.

BACKGROUND

Future generations of internal combustion engines (ICE) are likely to use hydrogen instead of fossil fuels for the combustion to become CO2 neutral. Dedicated injectors for the use of hydrogen are currently under development. Typically, such injectors require some kind of lubrication or thermal countermeasures to reduce inner frictions and ensure lifetime durability.

Current gas injectors often could be lubricated by a small amount of oil to reduce the thermal stress. On one hand, oil has superior properties to reduce the thermal stress by taking away the heat and the absolute perfect lubrication properties but, on the other hand, even small amounts of oil lead to deposit formation within the injector (especially at the injector tip area) and the combustion chamber. These deposits are even more critical for hydrogen combustion engines, as the smallest amounts of oil drops or coking deposits from oil might cause severe pre-ignition due to the very low ignition limits of hydrogen. Such a pre-ignition can significantly harm the engine. Therefore, the injectors need to stay clean all the time. Acids are a well-known deposit cleaner and originated from the base chemical-additive industry.

US Publication No. 2022/0017365 A1 describes a large-scale industrial process for the separation and concentration of nitrite from aqueous solutions and gaseous streams.

SUMMARY

Hence, there is a need to find solutions for improving lubrication of a hydrogen injector in a vehicle.

To this end, embodiments of the present invention provide a system, a vehicle, and a method for lubricating a hydrogen injector in a vehicle.

According to one embodiment of the invention, a system for lubricating a hydrogen injector in a vehicle includes an extraction and separation device configured to collect at least a fraction of an exhaust gas of a hydrogen combustion engine and separate a water component from the collected fraction of the exhaust gas to provide liquid water and dried exhaust gas and a reactor connected to the extraction and separation device and configured to generate nitric acid from the liquid water and a nitrogen oxide content of the dried exhaust gas, wherein the hydrogen injector is connected to the reactor and configured to receive the generated nitric acid for lubrication.

According to a second embodiment of the invention, a vehicle including a hydrogen combustion engine, a hydrogen injector connected to the hydrogen combustion engine, and the inventive system for lubricating a hydrogen injector is provided.

According to a third embodiment of the invention, a method for lubricating a hydrogen injector in a vehicle includes collecting a fraction of exhaust gas of a hydrogen combustion engine, extracting a water component from the collected fraction of the exhaust gas to provide liquid water and dried exhaust gas, generating, in a reactor, nitric acid from the dried exhaust gas and the liquid water, and introducing the generated nitric acid to the hydrogen injector.

One embodiment of the present invention uses a single medium for lubricating the hydrogen injector and for keeping the hydrogen injector clean at the same time. The medium, i.e., the lubricant, is gained from the exhaust gas, which typically contains nitrogen oxides (NOx) and a high water (H2O) content, which typically is of up to about 20%. Nitrogen oxide and water are able to generate a slight or light (for example PH=5~6) nitric acid (HNO3). This acid is only extracted from the exhaust and used as fluid to cool, lubricate, and clean the injector.

Thus, exhaust gas from a hydrogen combustion engine, such as a H2-ICE-type engine, typically contains nitrogen oxides and water. In embodiments of the present invention, the exhaust gas is partly extracted from the exhaust line and cooled, thereby condensed. Subsequently, the water content or component is separated. In a heated reactor, a portion of this liquid water reacts with the NOx in the exhaust on a catalytic surface to nitric acid HNO3. The chemical equation of the reaction is as follows:

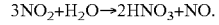

$$3NO_2 + H_2O \rightarrow 2HNO_3 + NO. \qquad \text{Equation 1:}$$

The nitric acid is introduced into the inlet of the hydrogen injector.

A particular advantage of embodiments of the present invention is that the components and the generation of the nitric acid are available on board the vehicle so there is no need for the customer to re-fill any additional fluids aside from the hydrogen as the fuel of the engine.

It is understood that the term "vehicle" or "vehicular" or other similar term as used herein is inclusive of motor vehicles in general such as passenger automobiles including sport utility vehicles (SUVs), buses, trucks, various commercial vehicles, and the like, and includes hybrid vehicles, electric vehicles, plug-in hybrid electric vehicles, hydrogen-powered vehicles and other gaseous fuel vehicles (e.g., fuels derived from resources other than crude oil). As referred to herein, a hybrid vehicle is a vehicle that has two or more sources of power, for example both combustion engine and electric-powered vehicles.

It is further understood that although a hydrogen powered vehicle having a hydrogen combustion engine and a hydrogen injector is discussed here, this principle can readily be applied to a natural gas powered vehicle using a natural gas, such as e.g., methane, as fuel and having a natural gas combustion engine and a natural gas injector.

Advantageous embodiments and improvements of the present invention are found in the subordinate claims.

According to an embodiment of the invention, the extraction and separation device comprises a water pump configured to receive the liquid water and regulate an amount of the liquid water directed to the reactor. The water pump may be controlled by a controller, thus controlling the amount of water directed to the reactor. Accordingly, the reaction of NOx and the liquid water can be controlled in a precise manner so that a moderate reaction can occur in the reactor.

According to an embodiment of the invention, the extraction and separation device comprises a tank for storing the liquid water. Accordingly, the liquid water can be stored to be available on demand at any time. Furthermore, the liquid water may be used for other purposes than the reaction to nitric acid. Moreover, the tank may be refilled externally, if necessary.

According to an embodiment of the invention, the extraction and separation device comprises a condenser configured to cool the collected exhaust gas such that at least part of the water component of the exhaust gas condenses to provide liquid water. The condenser provides a compact setup to cool the exhaust gas and obtain liquid water.

According to an embodiment of the invention, the extraction and separation device comprises a separator configured to separate the water component or the liquid water from the exhaust gas. Preferably, the separator is configured as a cyclonic separator. Alternatively, the separator comprises a membrane for separating the water component or the liquid water from the exhaust gas. The separator provides an efficient and well-proven way to separate the water component or liquid water (e.g., in the form of steam) from the exhaust gas.

According to an embodiment of the invention, the extraction and separation device comprises an exhaust gas control valve configured to regulate an amount of the collected fraction of the exhaust gas. For this purpose, a controller may be connected to the exhaust gas control valve and configured to control the collected fraction by controlling a stroke of an opening degree of the exhaust gas control valve. This allows for a more accurate control of the amount of produced nitric acid generated by the reactor.

According to an embodiment of the invention, the extraction and separation device comprises a water outlet pump configured to introduce the liquid water into an air inlet line of the hydrogen combustion engine. In this way, not needed liquid water can be dosed into the hydrogen combustion engine to be recycled in the combustion process. This addition of liquid water is also advantageous for the combustion process in the hydrogen combustion engine.

According to an embodiment of the invention, the reactor comprises a heating chamber for the reaction of liquid water and NOx to nitric acid. A controller is connected to the reactor and configured to control a temperature of the heating chamber. This allows a moderate chemical reaction for generating nitric acid.

According to an embodiment of the invention, the reactor is configured to heat the heating chamber by an electric heater. An electric heater allows a very precise control of the temperature in the reactor or the reaction chamber.

According to an embodiment of the invention, the reactor is configured to heat the heating chamber by heat extracted from at least one of the exhaust gas and cooling water of the hydrogen combustion engine. These configurations allow onboard-generated heat to be used for the reaction. Thus, the energy consumption of the system or the vehicle is reduced.

According to an embodiment of the invention, the reactor further comprises a catalyzer. The catalyzer may be in particular a catalytic converter surface, which may comprise a metal, preferably platinum (Pt) and/or rhodium (Rh). The catalyzer increases the efficiency of the chemical reaction in the reactor.

According to an embodiment of the invention, the system further comprises a nitric acid pump configured to compress the generated nitric acid and introduce the nitric acid into a hydrogen fuel line connected to the hydrogen injector. The nitric acid pump in particular is configured to regulate the amount of nitric acid into the fuel line. The nitric acid pump allows regulating the amount of nitric acid and thus ensures that a suitable amount of nitric acid is introduced to the hydrogen injector for lubrication and cleaning.

According to an embodiment of the invention, the system further comprises a nitric acid tank connected to the reactor and configured to store the generated nitric acid. According to the embodiment, the method further comprises the step of storing the generated nitric acid in a nitric acid tank. This ensures the availability of nitric acid even when the hydrogen combustion engine runs at no or low power.

According to an embodiment of the invention, the system may comprise a controller configured to control the exhaust gas control valve, the reactor, the water outlet pump, and/or the nitric acid pump. The controller may be configured as a demand controlled device for each of these components. This allows the control of the entire described system and thus the process of generating nitric acid for lubricating the hydrogen injector.

Embodiments of the invention will be explained in greater detail with reference to exemplary embodiments depicted in the drawings as appended.

BRIEF DESCRIPTION OF THE DRAWINGS

The accompanying drawings are included to provide a further understanding of embodiments of the present invention and are incorporated in and constitute a part of this specification. The drawings illustrate the embodiments of the present invention and together with the description serve to explain the principles of embodiments of the invention. Other embodiments of the present invention and many of the intended advantages of embodiments of the present invention will be readily appreciated as they become better understood by reference to the following detailed description. The elements of the drawings are not necessarily to scale relative to each other. In the figures, like reference numerals denote like or functionally like components, unless indicated otherwise.

Figure 1:
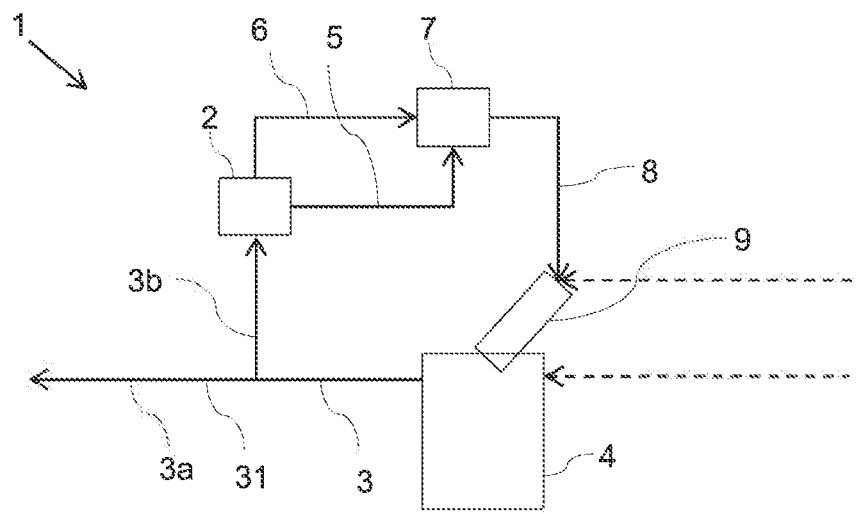
FIG. 1 schematically depicts a system for lubricating a hydrogen injector in a vehicle according to an embodiment of the invention.

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

The following reference identifiers may be used in connection with the accompanying drawings to describe embodiments of the invention.

1 system
2 extraction and separation device
3 exhaust gas 3a remaining exhaust gas
3b fraction of exhaust gas collected by device
4 hydrogen combustion engine
5 liquid water
6 dried exhaust gas
7 reactor
8 nitric acid
9 hydrogen injector
21 water pump
22 water tank
23 condenser
24 separator
25 exhaust gas valve
26 water outlet pump
31 exhaust line
41 air inlet line
42 charge air cooler
43a compressor
43b turbine
71 heating chamber
81 nitric acid pump
82 nitric acid tank
91 fuel line
100 controller
200 vehicle
H heat

DETAILED DESCRIPTION OF ILLUSTRATIVE EMBODIMENTS

FIG. 1 schematically depicts a system for lubricating a hydrogen injector in a vehicle according to an embodiment of the invention.

FIG. 1 shows a system 1 for lubricating a hydrogen injector 9 in a vehicle. The system 1 comprises an extraction and separation device 2 configured to collect at least a fraction 3b of an exhaust gas 3 of a hydrogen combustion engine 4. In this embodiment, the fraction 3a is collected from an exhaust line 31, which is connected to the hydrogen combustion engine 4 emitting its exhaust gas 3. The remaining exhaust gas 3a is emitted to the exterior. The extraction and separation device 2 is further configured to separate a water component from the collected fraction 3b of the exhaust gas 3 to provide liquid water 5 and dried exhaust gas 6.

The system 1 comprises a reactor 7 connected to the extraction and separation device 2 through two separate connections over which the liquid water 5 and the dried exhaust gas 6 are transported to the reactor 7. The reactor 7 is configured to generate nitric acid 8 from the liquid water 5 and a nitrogen oxide content of the dried exhaust gas 6. Typically, the nitrogen oxide content is of up to about 20% in the exhaust gas 3, which suffices for the intended reaction. Nitrogen oxide and water are able to generate a slight or light (weak PH, e.g., PH=5~6) nitric acid (HNO3) 8. This acid is thus extracted from the exhaust gas 3. The chemical equation of the reaction is as follows:

$$3NO_2 + H_2O \rightarrow 2HNO_3 + NO. \qquad \text{Equation 1:}$$

This reaction and a respective reactor 7 are commonly used in various fields of application (chemical or process industry, etc.). The fundamental working principle is to increase the chemical reactions by an increased surface of a material, which is supporting these reactions. Therefore, a catalytic converter surface made of metal, such as platinum, rhodium, etc. may be included in the reactor 7. Examples for fundamental reactions in huge scale chemical industry with catalytic converters are the "Haber-Bosch-Process" to generate ammonia or the "Ostwald-Process" to produce HNO3 with platinum-rhodium catalytic converters.

The hydrogen injector 9 is connected to the reactor 7. The hydrogen injector 9 is configured to receive the generated nitric acid 8. The nitric acid 8 is thus introduced into the inlet of the hydrogen injector 9 and used as fluid to cool, lubricate, and clean the injector.

Figure 2:
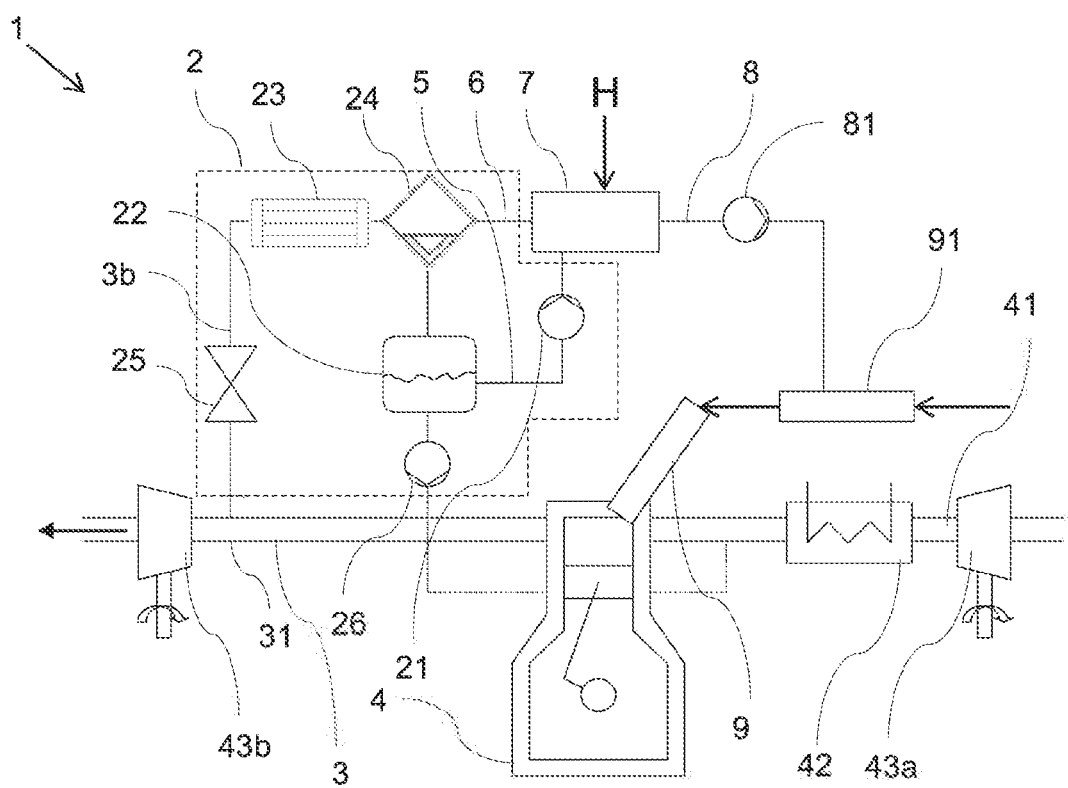
FIG. 2 schematically depicts a system for lubricating a hydrogen injector in a vehicle according to a further embodiment of the invention.

FIG. 2 schematically depicts a system for lubricating a hydrogen injector in a vehicle according to a further embodiment of the invention.

The system 1 shown in FIG. 2 is based on the embodiment of the system 1 shown in FIG. 1.

In the system 1 shown in FIG. 2, the extraction and separation device 2 comprises a water pump 21, which is configured to receive the liquid water 5 and regulate an amount of the liquid water 5 directed to the reactor 7. The extraction and separation device 2 further comprises a water tank 22 for storing the liquid water 5. The water pump 21 is thus connected between the water tank 22 and the reactor 7. The water is stored in the water tank 22 at atmospheric pressure. The exhaust gas 3 and the dried exhaust gas 6 are under a pressure of 1 to 4 bar. Therefore, the water pump 21 also compresses the separated liquid water 5 to a pressure between 1 to 4 bar for the reaction with the nitrogen oxide in the reactor 7. In FIG. 2, it is indicated that heat H is input into the reactor 7 for the chemical reaction. This principle is described further below.

The extraction and separation device 2 comprises a condenser 23 configured to cool the collected fraction 3b of the exhaust gas 3 such that at least part of the water component of the collected fraction 3b of the exhaust gas 3 condenses to provide the liquid water 5.

The extraction and separation device 2 comprises a separator 24 configured to separate the water component or the liquid water 5 from the exhaust gas 3 by means of rotation. The separator 24 is connected downstream to the condenser 23 and upstream to the reactor 7 and the water tank 22. Several chemical or physical principles can be used for this application. In this embodiment, a cyclone separator 24 is used to separate the liquid water 5 from the collected fraction 3b of the exhaust gas 3 or the dried exhaust gas 6. The different density of the media are used with support of centrifugal force, to separate the liquid water 5 from the collected fraction 3b of the exhaust gas 3. In further embodiments, a method for water separation can make use of a membrane.

In the system 1 shown in FIG. 2, the extraction and separation device 2 further comprises an exhaust gas control valve 25 configured to regulate an amount of the collected fraction 3b of the exhaust gas 3. The exhaust gas control valve 25 is thus connected between the exhaust line 31 and the condenser 23. This valve may also be connected to and controlled by a controller (not shown in FIG. 2).

Furthermore, the extraction and separation device 2 comprises a water outlet pump 26 configured to introduce the liquid water 5 into an air inlet line 41 of the hydrogen combustion engine 4. The water outlet pump 26 is thus connected between the water tank 22 and the air inlet line 41. In this way, liquid water 5 stored in the water tank 22 and which is not needed may be reused in the hydrogen combustion engine 4.

The system 1 further comprises a nitric acid pump 81 configured to compress the generated nitric acid 8 and introduce the nitric acid 8 into a hydrogen fuel line 91 connected to the hydrogen injector 9. The compression is required due to the high pressure present in the fuel line 91, which is about 15-40 bar. The nitric acid pump 81 thus compresses the nitric acid 8 from 1 to 4 bar to about 15-40 bar. In this embodiment, the nitric acid pump 81 is configured to regulate an amount of the nitric acid 8 introduced into the fuel line 91.

With respect to the water pump 21, the water outlet pump 26, and the nitric acid pump 81, electrical pumps for these purposes and for nearly any suitable medium and any suitable size are available and can be employed for this task. These pumps can be controlled by on-/off- or can be fully dynamically controlled e.g., by a PWM signal, that may be provided by a controller (not shown in FIG. 2). In further embodiments, the system 1 includes a demand controlled device for controlling the amount of water directed to the reactor 7.

In addition, a turbocharger in the form of a compressor 43a in the air inlet line 41 for compressing air introduced into the hydrogen combustion engine 4 and a turbine 43b in the exhaust line 31 to expand the exhaust gas 3 is shown in FIG. 2. Furthermore, a charge air cooler 42 in the air inlet line 41 downstream of the compressor 43a to cool down the compressed air is shown in FIG. 2.

Figure 3:
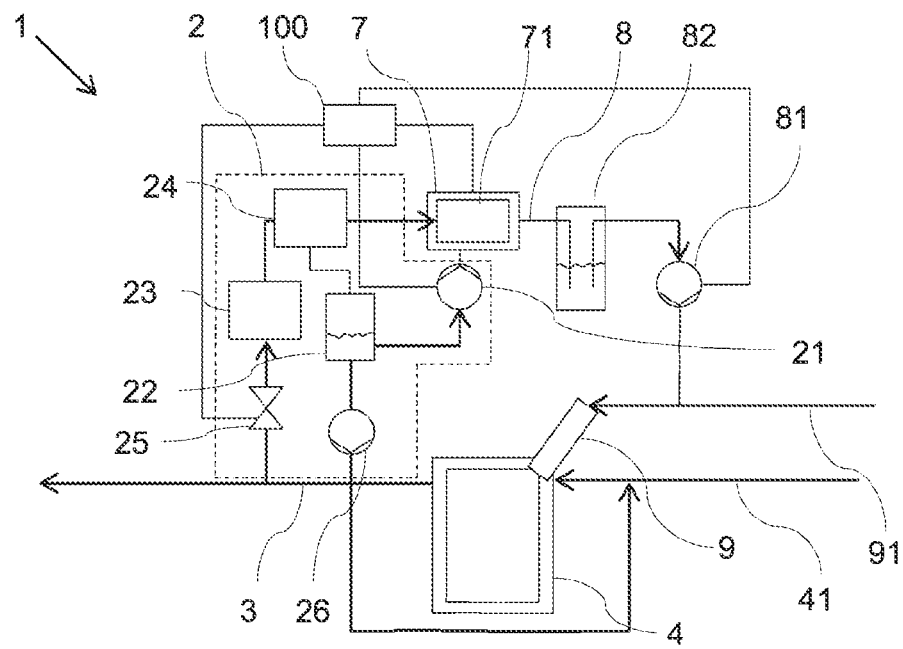
FIG. 3 schematically depicts a system for lubricating a hydrogen injector in a vehicle according to a further embodiment of the invention.

FIG. 3 schematically depicts a system for lubricating a hydrogen injector in a vehicle according to a further embodiment of the invention.

The system 1 shown in FIG. 3 is based on the embodiments of the system 1 shown in FIGS. 1 and 2.

It is shown in FIG. 3 that the reactor 7 comprises a heating chamber 71 for the reaction of the liquid water 5 and the nitrogen oxide to the nitric acid 8. The system 1 further comprises a controller 100 that is connected to the reactor 7 and configured to control a temperature of the heating chamber 71.

In this embodiment, the reactor 7 is configured to heat the heating chamber 71 by an electric heater. The enables precise control of the temperature in the reactor. A temperature sensor (not shown) in the heating chamber 71 gives an electrical feedback signal to the controller 100, which adapts the heat flow to the heating chamber 71 according to the temperature needed for the reaction.

In further embodiments, the reactor 7 is configured to heat the heating chamber 71 by heat extracted from at least one of the exhaust gas 3 and cooling water of the hydrogen combustion engine 4. In this way, no external energy source is need for heating the heating chamber 71. In any of these embodiments, the temperature of the heating chamber 71 can be controlled by the controller 100.

In addition to the reactor 7, the controller 100 is connected to the exhaust gas control valve 25 to control the collected fraction 3b of the exhaust gas 3, connected to the water pump 21 to control the amount of liquid water 5 directed to the reactor 7, and connected to the nitric acid pump 81 to control the amount of the nitric acid 8 introduced to the hydrogen injector 9. As described above, a standard electrical signal, such as a PWM-signal, may be used to control these components.

In this embodiment, the system 1 comprises a nitric acid tank 82 connected to the reactor 7 and configured to store the generated nitric acid 8. In this way, the nitric acid 8 can still be introduced to the hydrogen injector 9 even when the nitric acid 8 is not generated, e.g., during no or low power operation of the hydrogen combustion engine 4.

Figure 4:
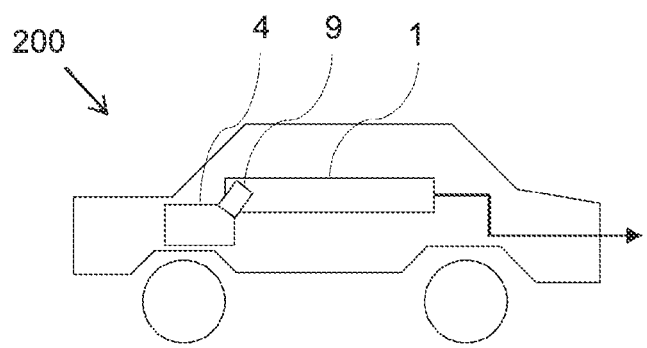
FIG. 4 schematically depicts a vehicle comprising the inventive system according to an embodiment of the invention.

FIG. 4 schematically depicts a vehicle comprising the inventive system according to an embodiment of the invention.

A vehicle 200 shown in FIG. 4 comprises the hydrogen combustion engine 4, the hydrogen injector 9 connected thereto, and the system 1 for lubricating the hydrogen injector 9. The system 1 may be any of the previously described embodiments of the system 1.

Figure 5:
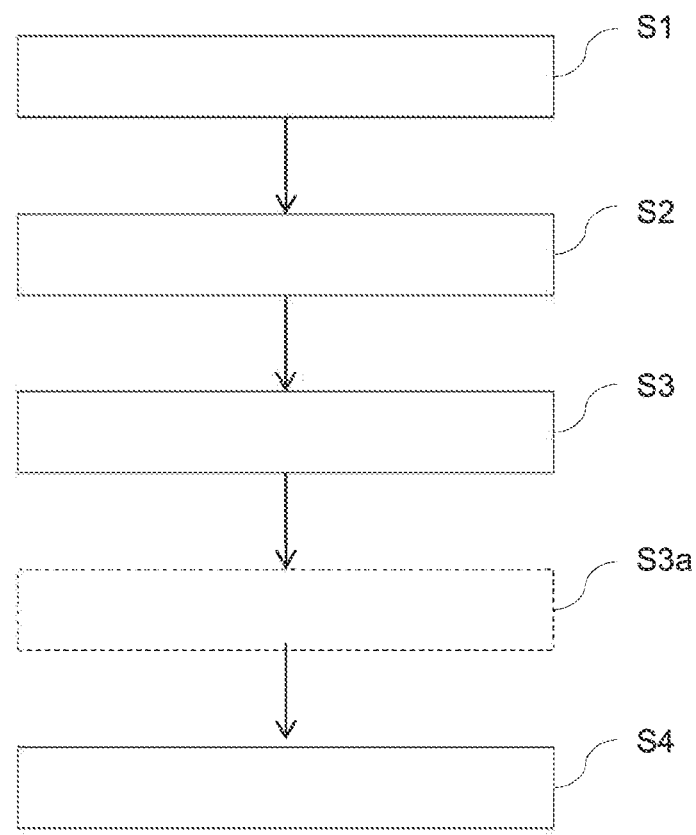
FIG. 5 schematically shows a flow diagram of a method for lubricating a hydrogen injector in a vehicle.

FIG. 5 schematically shows a flow diagram of a method for lubricating a hydrogen injector in a vehicle.

The method for lubricating the hydrogen injector 9 in a vehicle comprises the steps of collecting the fraction 3b of the exhaust gas 3 of the hydrogen combustion engine 4 (S1). The method further comprises extracting a water component from the collected fraction 3b of the exhaust gas 3b to provide the liquid water 5 and the dried exhaust gas 6 (S2).

A step of generating, in the reactor 7, the nitric acid 8 from the dried exhaust gas 6 and the liquid water 5 (S3) is provided by the method.

The method also comprises introducing the generated nitric acid 8 to the hydrogen injector 9 (S4).

The method also may also include the optional step of storing the generated nitric acid 8 in a nitric acid tank 82 (S3a).

In the foregoing detailed description, various features are grouped together in one or more examples or examples with the purpose of streamlining the disclosure. It is to be understood that the above description is intended to be illustrative and not restrictive. It is intended to cover all alternatives, modifications, and equivalents of the different features and embodiments. In particular, although a hydrogen powered vehicle having a hydrogen combustion engine and a hydrogen injector have been described in the embodiments above, this principle can readily be applied to a natural gas powered vehicle using a natural gas, such as e.g., methane, as fuel and having a natural gas combustion engine and a natural gas injector. Many other examples will be apparent to one skilled in the art upon reviewing the above specification. The embodiments were chosen and described in order to explain the principles of embodiments of the invention and their practical applications, to thereby enable others skilled in the art to utilize the invention and various embodiments with various modifications as are suited to the particular use contemplated.

What is claimed is:

1. A system for lubricating a hydrogen injector in a vehicle, the system comprising:
   an extraction and separation device configured to collect at least a fraction of an exhaust gas of a hydrogen combustion engine and separate a water component from the collected fraction of the exhaust gas to provide liquid water and dried exhaust gas; and
   a reactor connected to the extraction and separation device and configured to generate nitric acid from the liquid water and a nitrogen oxide content of the dried exhaust gas, wherein the hydrogen injector is connected to the reactor and configured to receive the generated nitric acid for lubrication.

2. The system according to claim 1, wherein the extraction and separation device comprises a water pump configured to receive the liquid water and regulate an amount of the liquid water directed to the reactor.

3. The system according to claim 1, wherein the extraction and separation device comprises a tank in which the liquid water is stored.

4. The system according to claim 1, wherein the extraction and separation device comprises a condenser configured to cool the collected exhaust gas such that at least part of the water component of the exhaust gas condenses to provide the liquid water.

5. The system according to claim 1, wherein the extraction and separation device comprises a separator configured to separate the water component or the liquid water from the exhaust gas.

6. The system according to claim 1, wherein the extraction and separation device comprises an exhaust gas control valve configured to regulate an amount of the collected fraction of the exhaust gas.

7. The system according to claim 1, wherein the extraction and separation device comprises a water outlet pump configured to introduce the liquid water into an air inlet line of the hydrogen combustion engine.

8. The system according to claim 1, wherein the reactor comprises a heating chamber for the reaction of the liquid water and the nitrogen oxide content to the nitric acid.

9. The system according to claim 8, further comprising a controller connected to the reactor and configured to control a temperature of the heating chamber.

10. The system according to claim 8, wherein the reactor is configured to heat the heating chamber by an electric heater.

11. The system according to claim 8, wherein the reactor is configured to heat the heating chamber by heat extracted from the exhaust gas or cooling water of the hydrogen combustion engine.

12. The system according to claim 1, further comprising a nitric acid pump configured to compress the generated nitric acid, introduce the nitric acid into a hydrogen fuel line connected to the hydrogen injector, and regulate an amount of the nitric acid introduced into the hydrogen fuel line.

13. The system according to claim 1, further comprising a nitric acid tank connected to the reactor and configured to store the generated nitric acid.

14. A vehicle comprising:
a hydrogen combustion engine;
an extraction and separation device configured to collect at least a fraction of an exhaust gas of the hydrogen combustion engine and separate a water component from the collected fraction of the exhaust gas to provide liquid water and dried exhaust gas;
a reactor connected to the extraction and separation device and configured to generate nitric acid from the liquid water and a nitrogen oxide content of the dried exhaust gas; and
a hydrogen injector connected to the hydrogen combustion engine and connected to the reactor and configured to receive the generated nitric acid for lubrication.

15. The vehicle according to claim 14, wherein the extraction and separation device comprises:
a water pump configured to receive the liquid water and regulate an amount of the liquid water directed to the reactor;
a tank in which the liquid water is stored;
a condenser configured to cool the collected exhaust gas such that at least part of the water component of the exhaust gas condenses to provide the liquid water;
a separator configured to separate the water component or the liquid water from the exhaust gas;
an exhaust gas control valve configured to regulate an amount of the collected fraction of the exhaust gas; and
a water outlet pump configured to introduce the liquid water into an air inlet line of the hydrogen combustion engine.

16. The vehicle according to claim 14, wherein the reactor comprises a heating chamber for the reaction of the liquid water and the nitrogen oxide content to the nitric acid.

17. The vehicle according to claim 14, further comprising a nitric acid pump configured to compress the generated nitric acid, introduce the nitric acid into a hydrogen fuel line connected to the hydrogen injector, and regulate an amount of the nitric acid introduced into the hydrogen fuel line.

18. The vehicle according to claim 14, further comprising a nitric acid tank connected to the reactor and configured to store the generated nitric acid.

19. A method for lubricating a hydrogen injector in a vehicle, the method comprising:
collecting a fraction of exhaust gas of a hydrogen combustion engine;
extracting a water component from the collected fraction of the exhaust gas to provide liquid water and dried exhaust gas;
generating, in a reactor, nitric acid from the dried exhaust gas and the liquid water; and
introducing the generated nitric acid to the hydrogen injector.

20. The method according to claim 19, further comprising storing the generated nitric acid in a nitric acid tank.

* * * * *